UNITED STATES PATENT OFFICE.

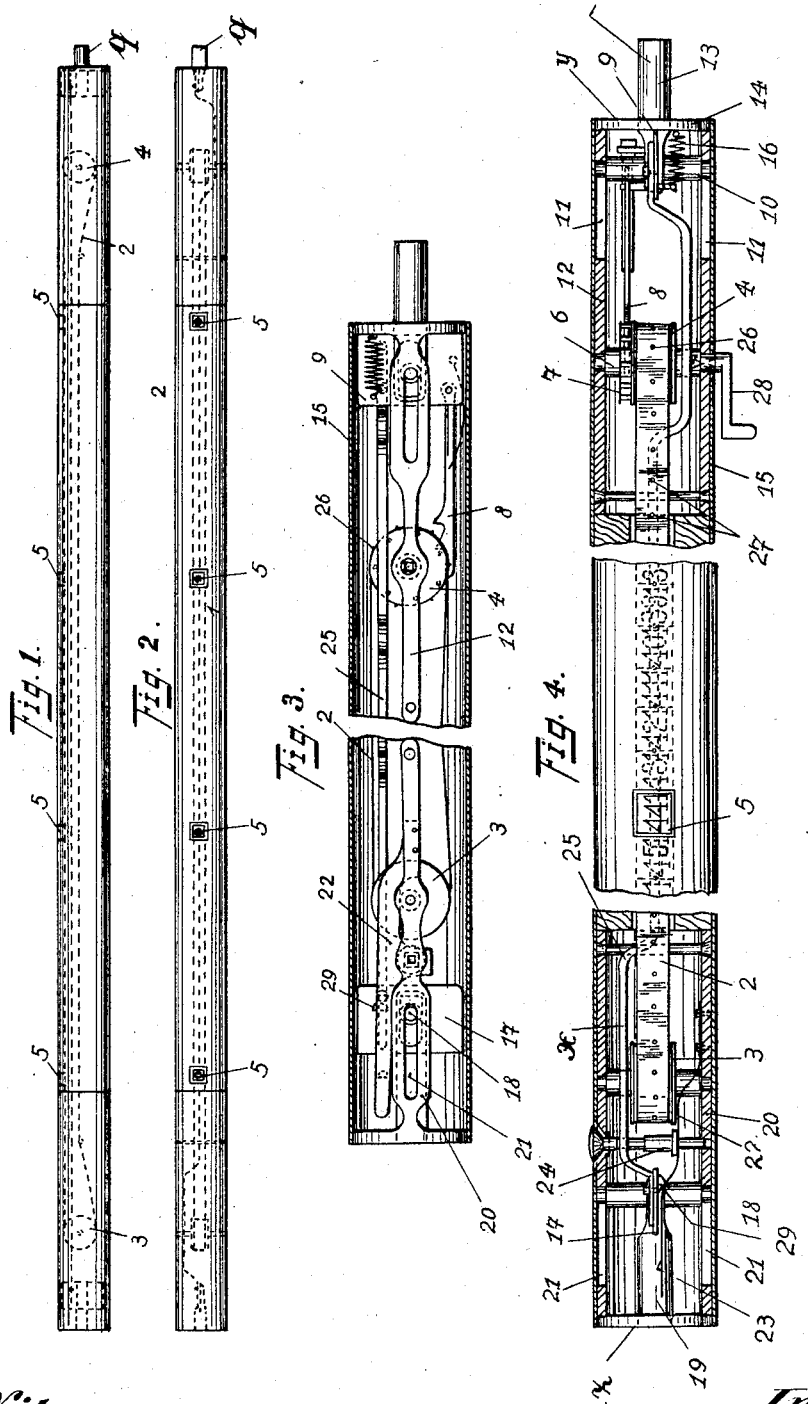

BARTOLOME APRIL, OF RAGATZ, SWITZERLAND.

LINEAL MEASURING-ROD.

1,179,264.  Specification of Letters Patent.  Patented Apr. 11, 1916.

Application filed January 11, 1915. Serial No. 1,616.

*To all whom it may concern:*

Be it known that I, BARTOLOME APRIL, citizen of Switzerland, residing at Ragatz, Switzerland, have invented certain new and useful Improvements in Lineal Measuring-Rods; and I do hereby declare the following to be a full, clear, and exact description of the invention, such as will enable others skilled in the art to which it appertains to make and use the same.

Measuring rods having a registering device operated by a plunger situated at one end of the rod are known.

The object of my invention is to facilitate the operation of measuring and avoid error when using two such measuring rods together by alternately placing the end of one against the end of the other in the known manner. I attain this object by the mechanism illustrated in the accompanying drawing, in which—

Figures 1 and 2 are two different elevations of a measuring rod constructed in accordance with one embodiment of this invention. Fig. 3 is a longitudinal section, and Fig. 4 an elevation partly in section of the rod on an enlarged scale.

Similar figures of reference refer to similar parts throughout the several views.

Referring to the figures generally, the measuring rod is internally longitudinally furnished with an endless tape measure 2 which is carried over guide pulleys 3, 4. The numerals on this tape measure are visible through apertures 5 formed in the rod.

The guide pulley 4 is rigidly connected with its shaft 6 and on the latter is employed a feed wheel 7 (Figs. 3 and 4) in which engages the spring influenced pawl 8. The pawl 8 is pivoted to the plate 9. The plate 9 is rigidly secured to the cross stud 10 mounted in the longitudinal slots 11 of the frame 12. To the stud 10 and plate 9 is secured the bar 13 which extends through the frame plate 14. The frame 12 is mounted in the tube 15. The coiled spring 16 retains the plate 9 and the stud 10 in the position shown in Figs. 3 and 4. The guide pulley 3 at the other end of the measuring rod together with the plate 17 secured to the cross stud 18 and the bar 19, is mounted in the frame 20. The cross stud 18 is also slidable in the longitudinal slots 21 of the frame 20. To the frame 20 is pivoted the back pawl 22 the tooth 23 of which is placed under the control of a depressible button headed pin 24. The plates 9 and 17 are connected together by means of a rod 25. The guide pulley 4 is furnished at its periphery with the pins 26, engaging in the perforations 27 of the endless tape measure to insure the correct feeding of the same. One end of the shaft of the guide pulley 4 is formed square for the reception of a key 28 to permit of adjusting the tape measure 2 to zero. In the measuring rod 1 is mounted the rod $x$ extending from one end thereof to the other, consisting of the parts 13, 9, 25, 17 and 19 and serving as feed member for the described register. Figs. 1-4 show the rod $x$ in its initial position in which the bar 13 projects a certain distance $q$ from the end $y$ of the measuring rod 1.

The graduations on the tape measure 2 are such, that when displacing the feed member $x$ in the measuring rod 1, that is to say, at each feeding movement, the numerals on the tape measure which appear opposite the said apertures increase in value in accordance with the length of the measuring rod.

In using the measuring rod constructed in accordance with this invention, two rods must always be used, one being placed against the other alternately. Assuming the length of the measuring rod is 5 meters, the numerals on the tape measure will increase 10 units in value; for instance the numerals on the tape measure of a measuring rod A would be 5, 15, 25 and for a measuring rod B, 10, 20, 30 and so on. In the case of a measuring rod 4 meters long the value of the numerals always increases eight units, hence, the measuring rod A is numbered 4, 12, 20 and so on and the rod B 8, 16, 24 and so on. In the case of a measuring rod three meters long the value of the numerals increases six units, hence, A is numbered 3, 9, 15, and B 6, 12, 18 and so on. If a measuring rod A 5 meters long has a number of reading apertures for example 4, at distances of one meter, the numerals 1, 2, 3, 4, 11, 12, 13, 14 and so on are visible, the fifth numeral being indicated by the end of the measuring rod, in a rod B the series of numerals 6, 7, 8, 9, 16, 17, 18, 19 and so on. When placing the two measuring rods against each other, the rod A will show the series of numerals 1—4 and B 6—9; when displacing the measuring rods, A will show the series of numerals 11—14 and B 16—19 and so on. If in the case of a measuring rod 5 meters long, the graduations of the tape measure are equal to 1 centimeter and the apertures are arranged at a distance of one meter, the tape measure will be sufficient to measure a distance of 1000 meters, after which the tape measure has to be set back to zero.

The measuring rod is used as follows: If a distance requires measuring, the assistant will place a rod A upon the starting point of the distance to be measured, move the feed member $x$ into the rod until the end of the bar 13 is flush with the rod end $y$; this causes the bar 19 at the other end $z$ of the rod to be slid out of the rod the same distance as the bar 13 has been slid in. This displacement of the feed member $x$ causes the feed pawl 8 to move the tape measure 2, for example in the case of a measuring rod 5 meters long, 5 units. During this movement a pin 29 on the plate 17 will take up a position behind the tooth 23 of the pawl 22 and thereby prevent the feeding member moving backward. Before placing a second measuring rod B against the first one A the pin 24 is depressed, the back pawl 22 and thereby its tooth 23 disengaged from the pin 29 and the feed member $x$ under the influence of the spring 16, displaces itself from the right to the left for the distance for which the bar 13 projects from the end of the measuring rod in its initial position. During this backward movement of the said bar the tape measure remains at rest, the teeth of the feed pawl 8 gliding over the teeth of the ratchet wheel 7. When placing the end $y$ of the second measuring rod B against the back end $z$ of the first measuring rod A, the feed member of B is actuated by the end $z$ of the measuring rod A, that is to say, the measuring rod B registers automatically. Having removed the measuring rod A from B and before placing A against B the pin 24 of B is depressed in the same manner as that of A has been depressed previously.

The distance measured by the first measuring rod need only be registered by hand when setting the rod at the commencement of the measuring operation.

In lieu of the said tape measure a distance counter may be built into the measuring rod.

I claim:

1. In a lineal measuring rod, the combination with an indicating and registering device, of an operating plunger at each end of the measuring rod, and means interconnecting the plungers, the aggregate length of the interconnecting means and plungers being greater by the length of one plunger than the length of the measuring rod, substantially as and for the purpose set forth.

2. In a lineal measuring rod, the combination with an indicating and registering device, of an operating plunger at each end of the measuring rod, of means interconnecting the plungers, the aggregate length of the interconnecting means and plungers being greater by the length of one plunger than the length of the measuring rod, and of locking means for locking the said plungers and interconnecting means out of their initial position until released by hand, substantially as and for the purpose set forth.

Signed at Zurich, Switzerland this 21st day of December 1914.

BARTOLOME APRIL.

Witnesses:
WILH. REINHARD,
CARL GUBLER.